US012586159B2

(12) United States Patent　　　　(10) Patent No.:　US 12,586,159 B2

Godaliyadda et al.　　　　　　　　(45) Date of Patent:　Mar. 24, 2026

(54) MULTI-FRAME HIGH DYNAMIC RANGE (HDR) IMAGE GENERATION USING QUANTA IMAGE FRAMES

(71) Applicant: Samsung Electronics Co., Ltd., Suwon-si (KR)

(72) Inventors: Gunawath Dilshan Godaliyadda, Allen, TX (US); Abhiram Gnanasambandam, Frisco, TX (US); John Seokjun Lee, Allen, TX (US); Hamid R. Sheikh, Allen, TX (US); Michael O. Polley, Garland, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 18/516,277

(22) Filed: Nov. 21, 2023

(65) Prior Publication Data

US 2025/0166129 A1　　May 22, 2025

(51) Int. Cl.
　　*G06T 5/50*　　　　(2006.01)
　　*G06T 7/00*　　　　(2017.01)
　　　　(Continued)

(52) U.S. Cl.
　　CPC .............. *G06T 5/50* (2013.01); *G06T 7/0002* (2013.01); *H04N 5/265* (2013.01); *H04N 23/80* (2023.01); *G06T 2207/10144* (2013.01); *G06T 2207/20208* (2013.01); *G06T 2207/20221* (2013.01); *G06T 2207/30168* (2013.01); *H04N 23/667* (2023.01)

(58) Field of Classification Search
None
See application file for complete search history.

(56) References Cited

U.S. PATENT DOCUMENTS 10,911,691 B1　　2/2021　Le et al.
10,939,042 B1　　3/2021　Dolan
　　　　(Continued)

FOREIGN PATENT DOCUMENTS

CN　　　115713515 A　　2/2023
CN　　　113538262 B　　4/2023
WO　　WO-2016123001 A1 *　8/2016 ........... H04N 19/119

OTHER PUBLICATIONS

"Imaging Electronics 101: Understanding Camera Sensors for Machine Vision Applications," web.archive.org, May 2023, 20 pages.
　　　　(Continued)

*Primary Examiner* — James M Hannett

(57) ABSTRACT

A method includes obtaining, using a multi-mode image sensor, first image frames and second image frames. The first image frames include image data having a first bit depth, and the second image frames include image data having a second bit depth smaller than the first bit depth. The first image frames are captured using two or more exposure times, and the second image frames are captured using at least one exposure time shorter than the two or more exposure times. At least one of the second image frames is captured in between each consecutive pair of the first image frames. The method also includes providing at least the first image frames to a multi-frame processing (MFP) pipeline and processing at least the first image frames using the MFP pipeline to generate an output image.

20 Claims, 8 Drawing Sheets

(51) Int. Cl.
H04N 5/265 (2006.01)
H04N 23/80 (2023.01)
*H04N 23/667* (2023.01)

(56) References Cited

U.S. PATENT DOCUMENTS

| | | | | |
|---|---|---|---|---|
| 11,431,918 | B1 * | 8/2022 | Price | H04N 5/253 |
| 11,503,221 | B2 * | 11/2022 | Yang | G06T 5/50 |
| 11,539,895 | B1 | 12/2022 | Seets et al. | |
| 11,721,054 | B2 | 8/2023 | Gupta et al. | |
| 2006/0133688 | A1 | 6/2006 | Kang et al. | |
| 2011/0304687 | A1 | 12/2011 | Joshi et al. | |
| 2015/0341576 | A1 | 11/2015 | Gu et al. | |
| 2017/0064204 | A1 | 3/2017 | Sapiro et al. | |
| 2017/0237905 | A1 | 8/2017 | Molgaard et al. | |
| 2019/0096046 | A1 | 3/2019 | Kalantari et al. | |
| 2019/0363118 | A1 | 11/2019 | Berkovich et al. | |
| 2020/0036918 | A1 * | 1/2020 | Ingle | H10F 39/8053 |
| 2023/0022753 | A1 | 1/2023 | Yang et al. | |
| 2023/0224599 | A1 * | 7/2023 | Gutierrez Barragan | |
| | | | | H10F 39/809 |
| | | | | 348/208.1 |
| 2025/0037231 | A1 * | 1/2025 | Gupta | G06T 3/4038 |
| 2025/0111540 | A1 * | 4/2025 | Novikov | G06T 7/11 |

OTHER PUBLICATIONS

Fossum et al., "The Quanta Image Sensor: Every Photon Counts," Sensors, 2016, 25 pages.

Bruschini et al., "Single-photon avalanche diode imagers in biophotonics: review and outlook," Light: Science & Applications, 2019, 28 pages.
Chi et al., "Dynamic Low-Light Imaging with Quanta Image Sensors," arXiv:207.08614v1 [eess.IV], Jul. 2020, 17 pages.
Ma et al., "Quanta Burst Photography," arXiv:2006.11840v1 [cs. CV], Jun. 2020, 28 pages.
Chen et al., "Reblur2Deblur: Deblurring Videos via Self-Supervised Learning," 2018 IEEE International Conference on Computational Photography (ICCP), 2018, 9 pages.
International Search Report and Written Opinion of the International Searching Authority dated Jun. 9, 2021 in connection with International Patent Application No. PCT/KR2021/002332, 8 pages.
Kim et al., "Generalized Video Deblurring for Dynamic Scenes," Proceedings of the IEEE Conference on Computer Vision and Pattern Recognition, 2015, 9 pages.
Kim et al., "Optical Flow via Locally Adaptive Fusion of Complementary Data Costs," IEEE International Conference on Computer Vision (ICCV), 2013, 8 pages.
Kupyn et al., "DeblurGAN: Blind Motion Deblurring Using Conditional Adversarial Networks," Proceedings of the IEEE Conference on Computer Vision and Pattern Recognition, 2018, 10 pages.
Sroubek et al., "Robust Multichannel Blind Deconvolution via Fast Alternating Minimization," IEEE Transactions on Image Processing, vol. 21, Issue 4, Apr. 2012, 14 pages.
Xie et al., "Multi-Exposure Motion Estimation Based on Deep Convolutional Networks," Journal of Computer Science and Technology, May 2018, 15 pages.
Yuan et al., "Image Deblurring with Blurred/Noisy Image Pairs," ACM Transactions on Graphics, Jul. 2007, 9 pages.
Zhang et al., "Dynamic Scene Deblurring Using Spatially Variant Recurrent Neural Networks," Proceedings of the IEEE Conference on Computer Vision and Pattern Recognition, 2018, 9 pages.

* cited by examiner

MULTI-FRAME HIGH DYNAMIC RANGE (HDR) IMAGE GENERATION USING QUANTA IMAGE FRAMES

TECHNICAL FIELD

This disclosure relates generally to imaging systems. More specifically, this disclosure relates to multi-frame high dynamic range (HDR) image generation using quanta image frames.

BACKGROUND

Many mobile electronic devices, such as smartphones and tablet computers, include cameras that can be used to capture still and video images. In some cases, electronic devices can capture multiple image frames of the same scene at different exposure levels and blend the image frames to produce a high dynamic range (HDR) image of the scene. The HDR image generally has a larger dynamic range than any of the individual image frames. Among other things, blending the image frames to produce the HDR image can help to incorporate greater image details into both darker regions and brighter regions of the HDR image.

SUMMARY

This disclosure relates to multi-frame high dynamic range (HDR) image generation using quanta image frames.

In a first embodiment, a method includes obtaining, using a multi-mode image sensor, first image frames and second image frames. The first image frames include image data having a first bit depth, and the second image frames include image data having a second bit depth smaller than the first bit depth. The first image frames are captured using two or more exposure times, and the second image frames are captured using at least one exposure time shorter than the two or more exposure times. At least one of the second image frames is captured in between each consecutive pair of the first image frames. The method also includes providing at least the first image frames to a multi-frame processing (MFP) pipeline and processing at least the first image frames using the MFP pipeline to generate an output image.

In a second embodiment, an electronic device includes a multi-mode image sensor configured to capture first image frames and second image frames. The multi-mode image sensor is configured such that the first image frames include image data having a first bit depth, the second image frames include image data having a second bit depth smaller than the first bit depth, the first image frames are captured using two or more exposure times, the second image frames are captured using at least one exposure time shorter than the two or more exposure times, and at least one of the second image frames is captured in between each consecutive pair of the first image frames. The electronic device also includes at least one processing device configured to process at least the first image frames using an MFP pipeline to generate an output image.

In a third embodiment, a non-transitory machine readable medium contains instructions that when executed cause at least one processor of an electronic device to obtain, using a multi-mode image sensor, first image frames and second image frames. The first image frames include image data having a first bit depth, and the second image frames include image data having a second bit depth smaller than the first bit depth. The first image frames are captured using two or more exposure times, and the second image frames are captured using at least one exposure time shorter than the two or more exposure times. At least one of the second image frames is captured in between each consecutive pair of the first image frames. The non-transitory machine readable medium also contains instructions that when executed cause the at least one processor to provide at least the first image frames to an MFP pipeline and process at least the first image frames using the MFP pipeline to generate an output image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOME-POD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description, taken in conjunction with the accompanying drawings, in which.

5

Figure 2:
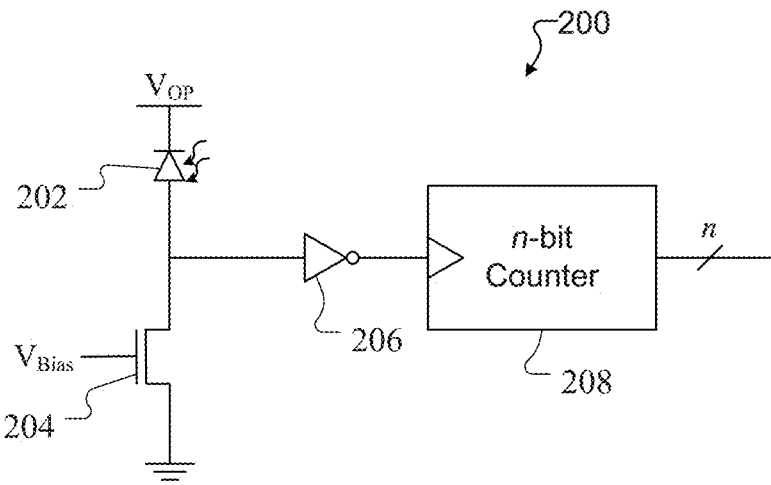
Figure 4:
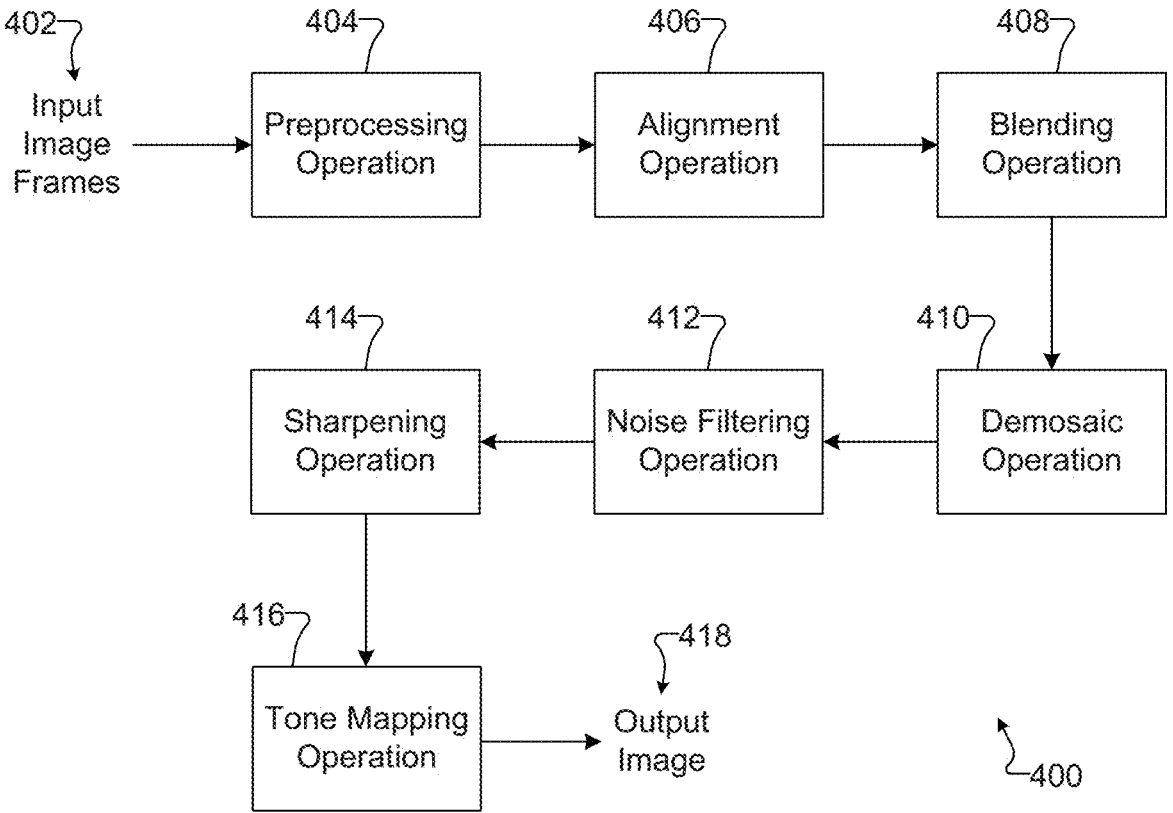
Figure 3:
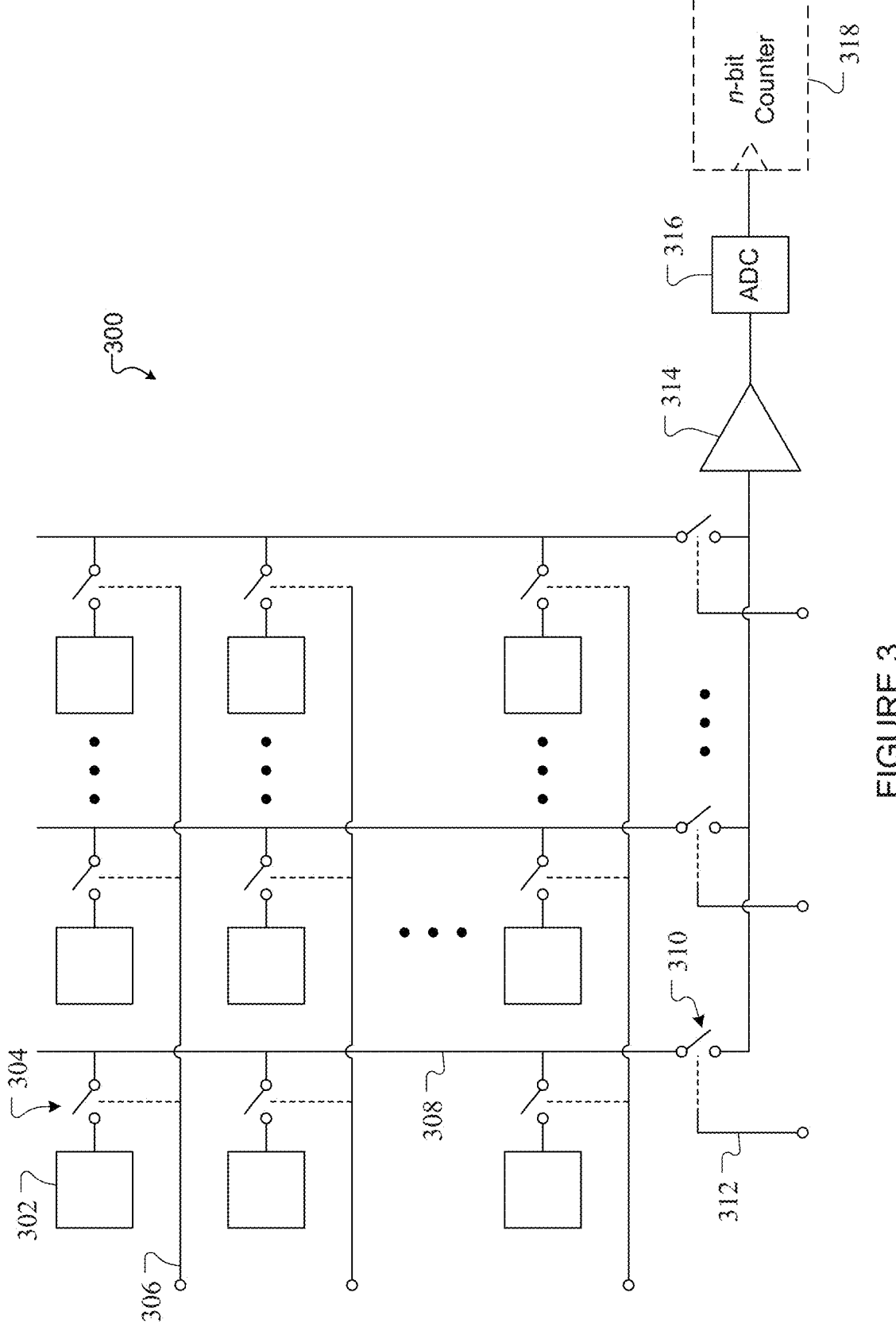
Figure 5:
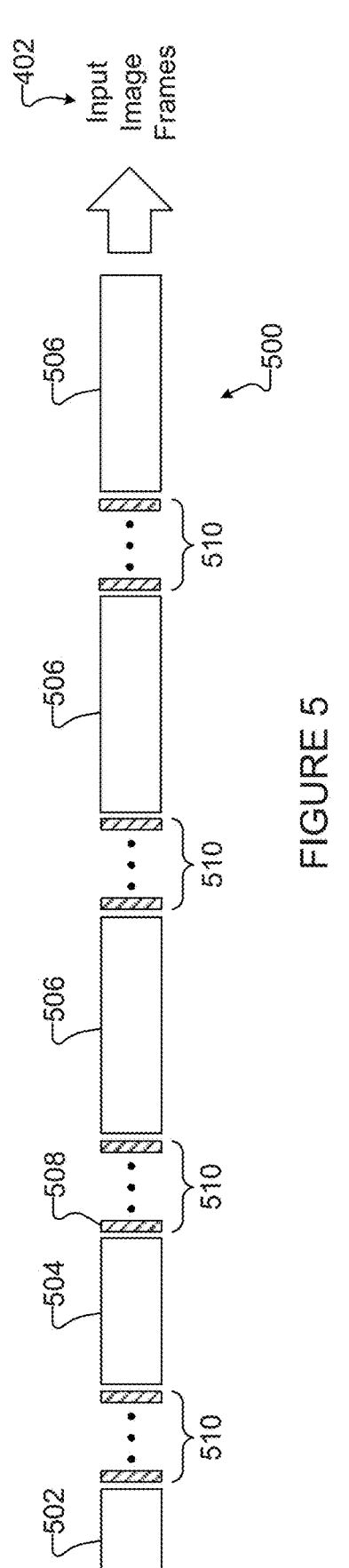
Figure 6:
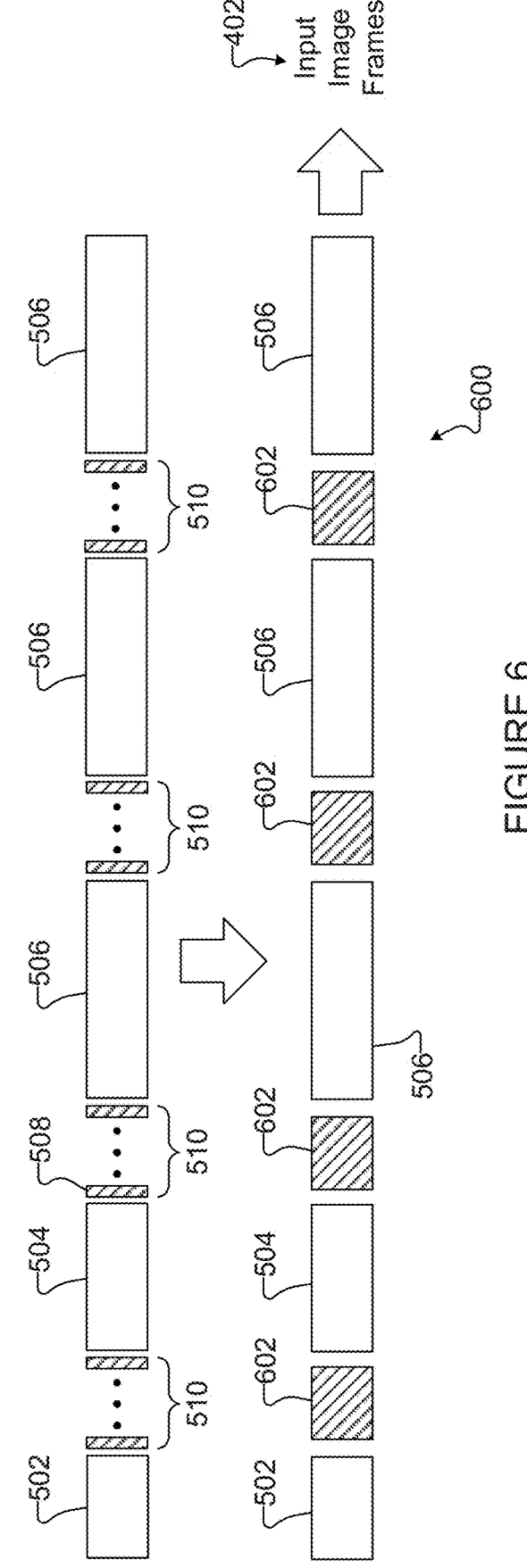
Figure 7:
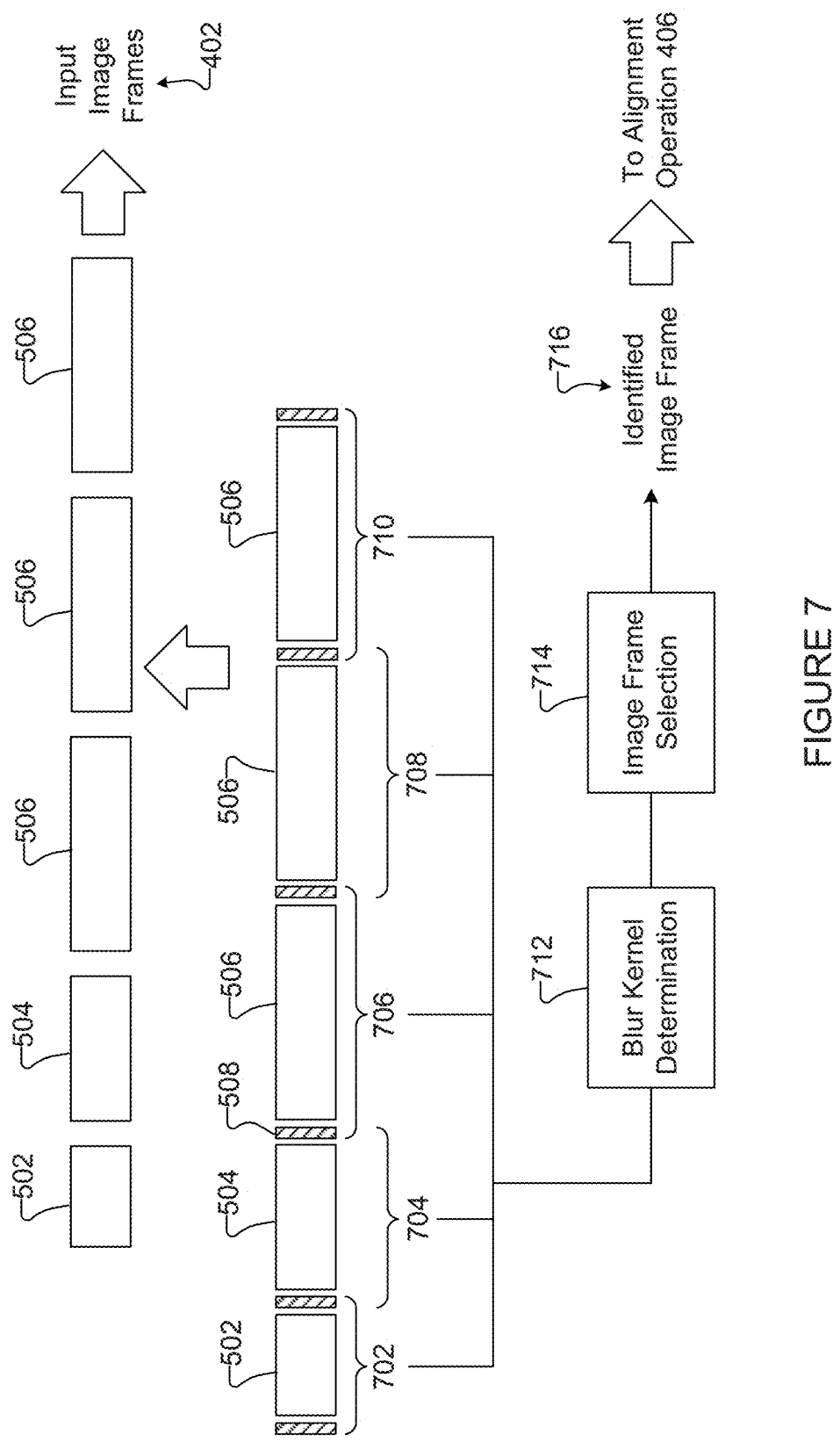
Figure 8:
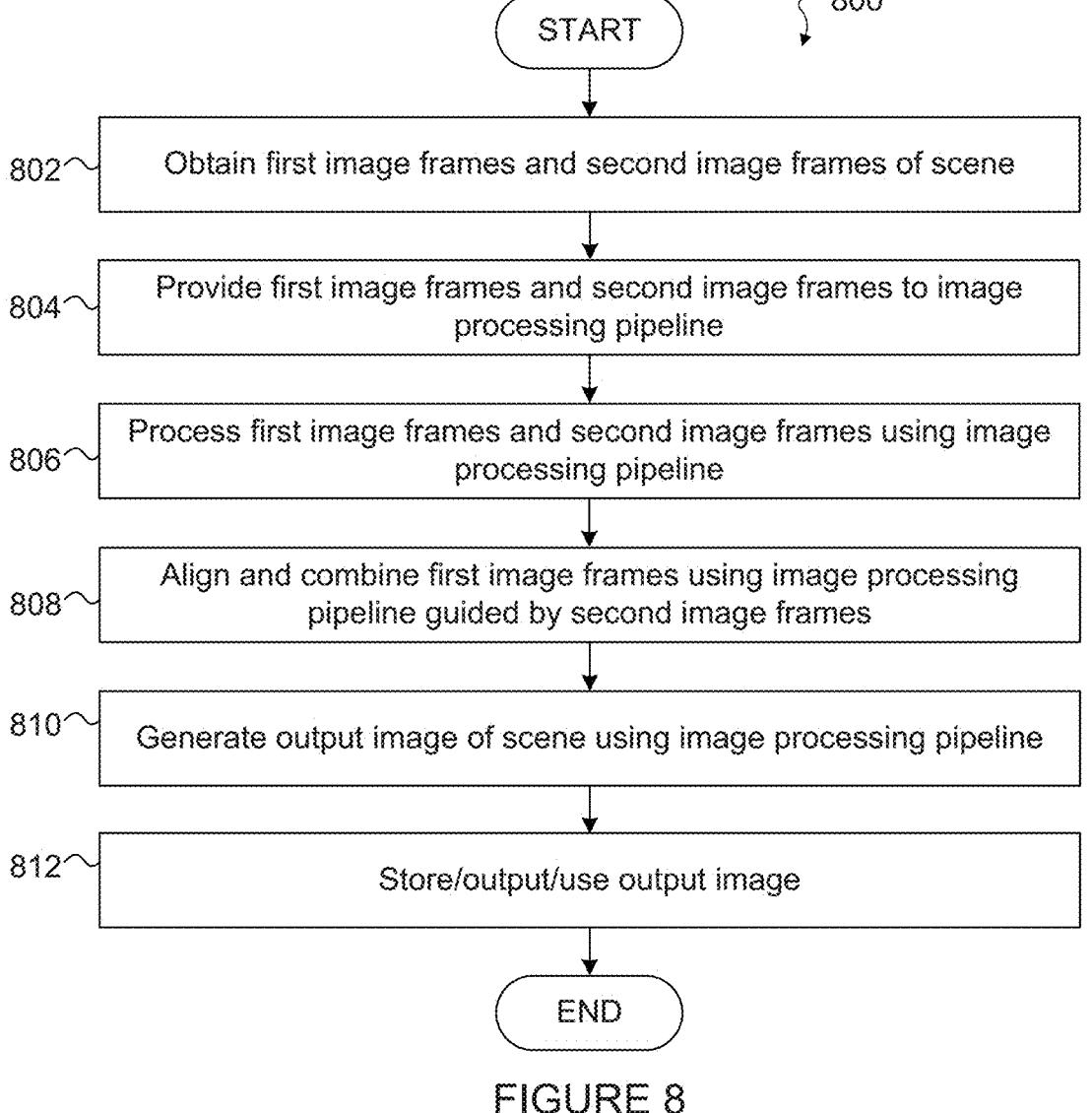
Figure 9:
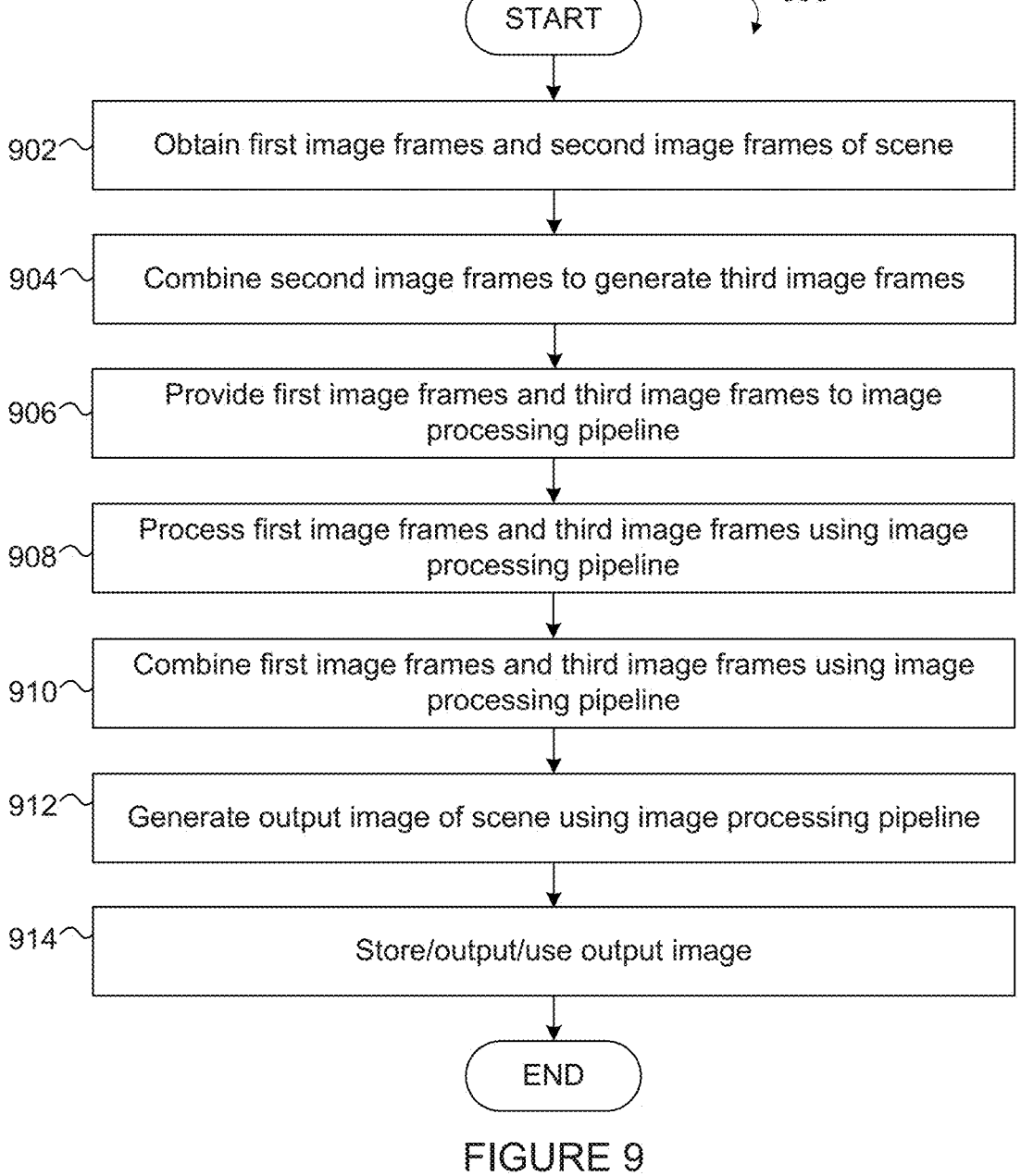
Figure 10:
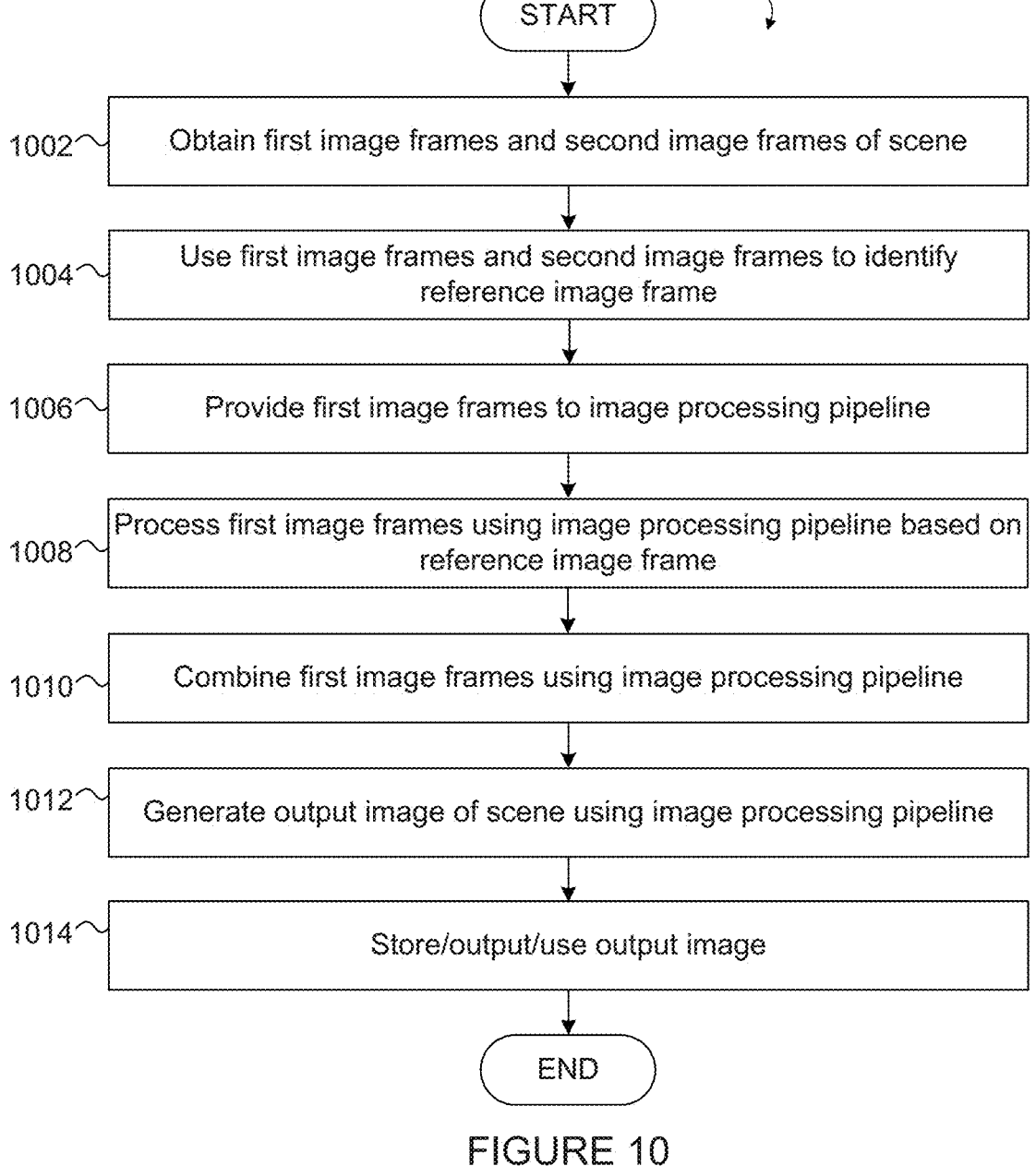

FIGS. 2 and 3 illustrate portions of example dual-mode image sensors of an electronic device in accordance with this disclosure;

FIG. 4 illustrates an example image processing pipeline supporting multi-frame high dynamic range (HDR) image generation using quanta image frames in accordance with this disclosure;

FIGS. 5 through 7 illustrate example techniques for using quanta image frames during HDR image generation in accordance with this disclosure; and FIGS. 8 through 10 illustrate example methods for HDR image generation using quanta image frames in accordance with this disclosure.

DETAILED DESCRIPTION

FIGS. 1 through 10, discussed below, and the various embodiments of this disclosure are described with reference to the accompanying drawings. However, it should be appreciated that this disclosure is not limited to these embodiments, and all changes and/or equivalents or replacements thereto also belong to the scope of this disclosure. The same or similar reference denotations may be used to refer to the same or similar elements throughout the specification and the drawings.

As noted above, many mobile electronic devices, such as smartphones and tablet computers, include cameras that can be used to capture still and video images. In some cases, electronic devices can capture multiple image frames of the same scene at different exposure levels and blend the image frames to produce a high dynamic range (HDR) image of the scene. The HDR image generally has a larger dynamic range than any of the individual image frames. Among other things, blending the image frames to produce the HDR image can help to incorporate greater image details into both darker regions and brighter regions of the HDR image.

Unfortunately, there are various circumstances in which multiple image frames of a scene cannot be blended to produce an HDR image. For example, because an electronic device itself and/or objects within the scene may move during image capture, the multiple image frames typically need to be aligned or registered before blending can occur. Often times, image registration involves selecting a reference image frame and warping other non-reference image frames so that common points within the scene appear at the same or similar locations within the image frames. However, image registration may fail in various situations, such as when a reference or non-reference image frame has a poor signal-to-noise ratio (SNR). A poor SNR can be caused by various factors, such as low-light conditions or fast motion in the scene (which can create in-frame blur).

This disclosure provides various techniques for multi-frame HDR image generation using quanta image frames. As described in more detail below, first image frames and second image frames may be obtained using a multi-mode image sensor. The first image frames include image data having a first bit depth, and the second image frames include image data having a second bit depth smaller than the first bit depth. The first image frames are captured using two or more exposure times, and the second image frames are captured using at least one exposure time shorter than the two or more exposure times. At least one of the second image frames is captured in between each consecutive pair of the first image frames. At least the first image frames are provided to a multi-frame processing (MFP) pipeline, and at least the first image frames are processed using the MFP pipeline to generate an output image. For example, the output image may represent an HDR image having a larger dynamic range than any individual one of the first and second images. Various approaches are described below that allow the second image frames to be used during the generation of the output image, such as by using the second image frames directly in the MFP pipeline, generating third image frames for processing by the MFP pipeline based on the second image frames, or using the second image frames to select one of the first image frames as a reference frame during image registration.

In this way, the disclosed techniques allow for more effective image frame blending to occur in order to generate HDR images or other output images. For example, quanta image sensors (QIS) allow for photon counting to occur, meaning quanta image sensors support the ability to count individual photons in very low light scenarios. Quanta image sensors can be fabricated in various ways, such as by using complementary metal-oxide semiconductor (CMOS) technology (which may have low read noise) or single-photon avalanche diode (SPAD) technology (which may have no read noise). Quanta image sensors can also achieve much higher frame rates compared to traditional CMOS image sensors, such as when SPAD-based quanta image sensors can reach a capture rate of up to 100 kilo-frames per second or more. Some quanta image sensors can also operate in multiple modes, such as when the quanta image sensors can generate image data having fewer data bits and image data having more data bits. By using a combination of image frames having different bit depths (and potentially significantly different bit depths), it is possible to use the image frames having the smaller bit depths to mitigate issues related to poor SNR due to low illumination, in-frame motion blur, or other causes. Note that both the first image frames having the larger bit depth and the second image frames having the smaller bit depth can come from the same multi-mode image sensor, which allows for re-use of the image sensor. The various approaches described below for incorporating the second image frames having the smaller bit depth into the MFP pipeline support better image generation performance in low-light, fast motion, or other conditions while still achieving high dynamic range.

Figure 1:
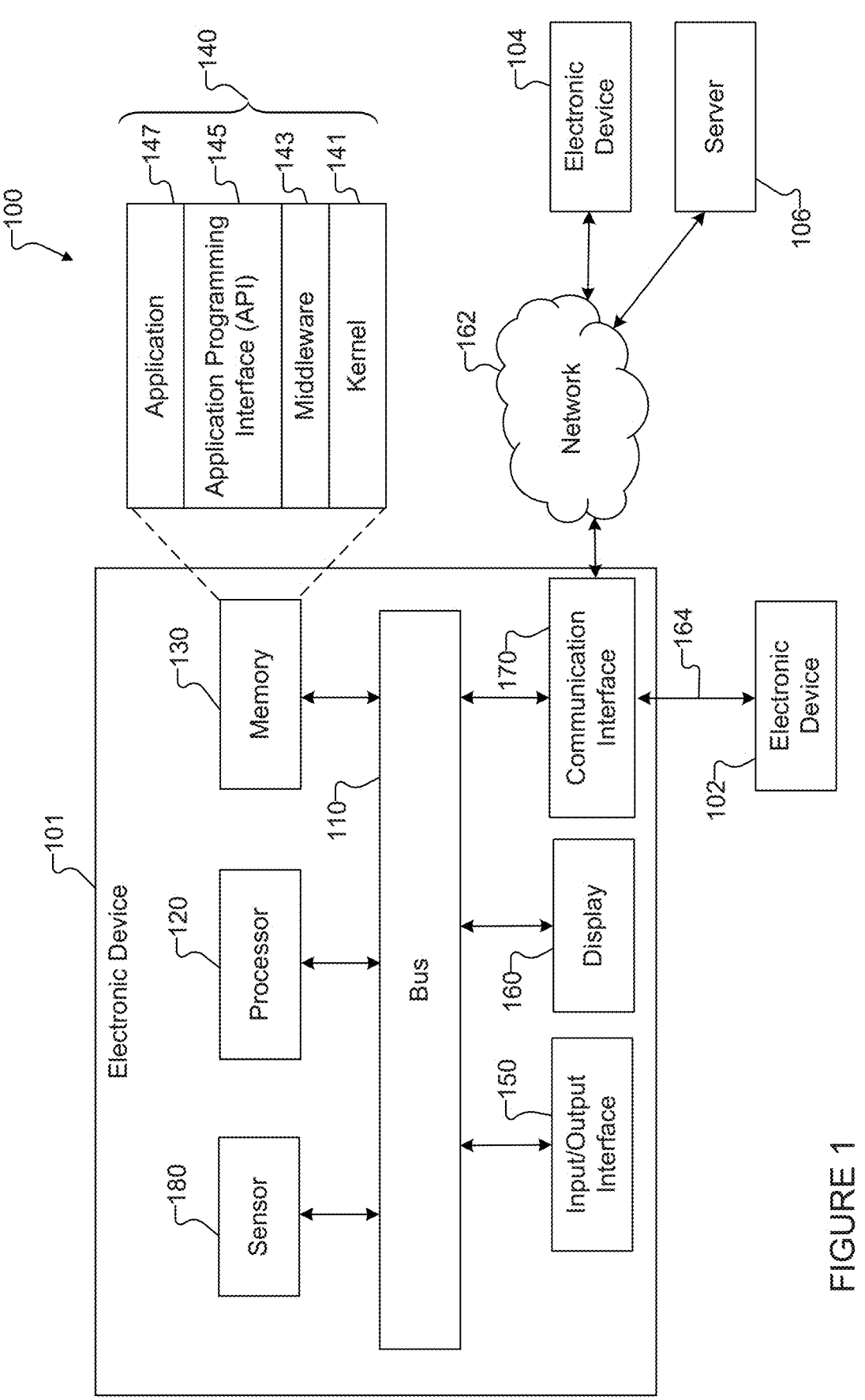
FIG. 1 illustrates an example network configuration including an electronic device in accordance with this disclosure.

FIG. 1 illustrates an example network configuration 100 including an electronic device in accordance with this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described below, the processor 120 may be used to perform multi-frame HDR image generation using quanta image frames.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may include one or more applications for performing multi-frame HDR image generation using quanta image frames. These functions can be performed by a single application or by multiple applications that each carries out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectrome-chanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals, such as images.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors, which may be used to capture images of scenes. As described below, at least one of the imaging sensors represents a multi-mode imaging sensor, which can capture image frames having different bit depths (and potentially significantly different bit depths). The sensor(s) 180 can also include one or more buttons for touch input, one or more microphones, a gesture sensor, a gyroscope or gyro sensor, an air pressure sensor, a magnetic sensor or magnetometer, an acceleration sensor or accelerometer, a grip sensor, a proximity sensor, a color sensor (such as an RGB sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that includes one or more imaging sensors.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described below, the server 106 may be used to perform multi-frame HDR image generation using quanta image frames.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

FIGS. 2 and 3 illustrate portions of example dual-mode image sensors 200 and 300 of an electronic device in accordance with this disclosure. For ease of explanation, the portions of the dual-mode image sensors 200 and 300 shown in FIGS. 2 and 3 are described as being used in the electronic device 101 in the network configuration 100 of FIG. 1, such as when the dual-mode image sensors 200 and 300 are used as an imaging sensor 180 in the electronic device 101. However, each of the dual-mode image sensors 200 and 300 shown in FIGS. 2 and 3 could be used with any other suitable device(s) and in any other suitable system(s).

As shown in FIG. 2, the dual-mode image sensor 200 represents a SPAD-based quanta image sensor. In this example, the illustrated portion of the dual-mode image sensor 200 includes a single-photon avalanche diode 202, which is configured to receive illumination and a bias voltage $V_{OP}$. The single-photon avalanche diode 202 represents a semiconductor device having a high reverse bias that allows an avalanche current to be created as a result of impact ionization caused by as little as a single photon striking the diode 202. In some cases, the diode 202 can generate a short pulse each time one or more photons are detected. The diode 202 is coupled in series with a transistor 204, which is biased using another bias voltage $V_{Bias}$. An inverter 206 coupled between the diode 202 and the transistor 204 functions as a discriminator that detects a change in voltage across the diode 202 during a detection event in which at least one photon is received by the diode 202. This may allow, for instance, the inverter 206 to vary its output based on the short pulses generated by the diode 202. The number of times that the diode 202 detects one or more photons can be counted using a counter 208 coupled to the inverter 206.

The counter 208 in the dual-mode image sensor 200 may support any suitable bit depths as needed or desired. For example, in one operational mode of the image sensor 200, the counter 208 may be used to generate image data having a larger bit depth, such as image data values each having between eight bits and twelve bits. In another operational mode of the image sensor 200, the counter 208 may be used to generate image data having a smaller bit depth, such as image data values each having between one bit and three bits. The image data having the larger bit depth represents the first image frames described below, and the image data having the smaller bit depth represents the second image frames described below. Note that the structure shown in FIG. 2 may be replicated across any desired number of pixels, possibly up to and including a large number of pixels, in an imaging sensor.

As shown in FIG. 3, the dual-mode image sensor 300 represents a CMOS-based quanta image sensor. In this example, the illustrated portion of the dual-mode image sensor 300 includes a number of pixels 302. Each pixel 302 includes circuitry for sensing illumination, such as a photodetector and one or more transistors for controlling the photodetector. Each pixel 302 includes or is coupled to a switch 304 (such as a transistor), where the switch 304 controls whether an output from the pixel is read. Each switch 304 is controlled using one of multiple row select lines 306, and each switch 304 is coupled to a column line 308. Each column line 308 is coupled to a switch 310 (such as a transistor), and each switch 310 is controlled using one of multiple column select lines 312.

The row select lines 306 and the column select lines 312 can be used to control which pixel 302 is coupled to an amplifier 314, which amplifies the output of the selected pixel 302 for output to an analog-to-digital converter (ADC) 316. The ADC 316 converts the amplified signal into an n-bit digital value, which represents a digital version of the output of the selected pixel 302. In some cases, the n-bit digital values may represent image data that is output for further processing. In other cases, the ADC 316 may represent a one-bit ADC, and the changes in the output of the ADC 316 can be counted using an n-bit counter 318. Varying which of the row select lines 306 and the column select lines 312 are activated controls which pixels 302 are used to generate image data, allowing image data for all pixels 302 to be obtained and used as an image. Note that each pixel 302 shown here can represent a CMOS-based quanta image sensor pixel.

The ADC 316 or the counter 318 in the dual-mode image sensor 300 may support any suitable bit depths as needed or desired. For example, in one operational mode of the image sensor 300, the ADC 316 or the counter 318 may be used to generate image data having a larger bit depth, such as image data values each having between eight bits and twelve bits. In another operational mode of the image sensor 300, the ADC 316 or the counter 318 may be used to generate image data having a smaller bit depth, such as image data values each having between one bit and three bits. Note that the structure shown in FIG. 3 may be used with any desired number of pixels 302, possibly up to and including a large number of pixels 302, in an imaging sensor.

As described in more detail below, either of the image sensors 200 and 300 may be used to capture first image frames and second image frames. The first image frames include image data having a first bit depth (such as between eight and twelve bits), and the second image frames include image data having a second bit depth (such as between one and three bits). The first image frames are captured using two or more exposure times, such as three exposure times defined as short, medium, and long exposure times. The second image frames are captured using at least one exposure time that is shorter than the two or more exposure times. At least one of the second image frames is captured in between each consecutive pair of the first image frames. The image frames are processed in order to generate an HDR or other image of a scene. Either one of the image sensors 200 and 300 may be used in this process since both image sensors 200 and 300 represent dual-mode image sensors in which different bit depths can be supported.

Although FIGS. 2 and 3 illustrate portions of example dual-mode image sensors 200 and 300 of an electronic device 101, various changes may be made to FIGS. 2 and 3. For example, the dual-mode image sensors 200 and 300 are shown in simplified form here so that the components and operations relevant to this disclosure can be described. Various SPAD-based and CMOS-based image sensors have been developed, and additional SPAD-based, CMOS-based, or other quanta image sensors are sure to be developed in the future. This disclosure is not limited to any particular implementation for a dual-mode image sensor or other multi-mode image sensor.

FIG. 4 illustrates an example image processing pipeline 400 supporting multi-frame HDR image generation using quanta image frames in accordance with this disclosure. For ease of explanation, the image processing pipeline 400 shown in FIG. 4 is described as being implemented on or supported by the electronic device 101 in the network configuration 100 of FIG. 1, where the electronic device 101 may include a multi-mode image sensor such as one shown in FIG. 2 or 3. However, the image processing pipeline 400 shown in FIG. 4 could be used with any other suitable device(s) and in any other suitable system(s), and the image processing pipeline 400 shown in FIG. 4 could be used with any suitable dual-mode or other multi-mode image sensor.

As shown in FIG. 4, the image processing pipeline 400 generally receives and processes a set of input image frames 402. The set of input image frames 402 may include image frames captured in rapid succession or at substantially the same time. The input image frames 402 may be obtained from any suitable source(s), such as when the input image frames 402 are captured using at least one camera or other imaging sensor 180 of the electronic device 101 during an image capture operation. The imaging sensor 180 that is used to capture the input image frames 402 supports multiple modes of operation, namely modes in which image data of different bit lengths can be produced.

In some embodiments, the input image frames 402 represent raw image frames. Raw image frames typically refer to image frames that have undergone little if any processing after being captured. The availability of raw image frames can be useful in a number of circumstances since the raw image frames can be subsequently processed to achieve the creation of desired effects in output images. In many cases, for example, the input image frames 402 can have a wider dynamic range or a wider color gamut that is narrowed during image processing operations in order to produce still or video image frames suitable for display or other use. The set of input image frames 402 here may include any suitable number of input image frames 402. Each input image frame 402 can have any suitable format, such as a Bayer or other raw image format, a red-green-blue (RGB) image format, or a luma-chroma (YUV) image format. Each input image frame 402 can also have any suitable resolution, such as up to fifty megapixels or more.

The input image frames 402 include image frames captured using different capture conditions. The capture conditions can represent any suitable settings of the electronic device 101 or other device used to capture the input image frames 402. For example, the capture conditions may represent different exposure settings of the imaging sensor(s) 180 used to capture the input image frames 402, such as different exposure times or ISO settings. In multi-frame processing pipelines, multiple input image frames 402 can be captured using different exposure settings so that portions of different input image frames 402 can be combined to produce an HDR output image or other blended image. Note that the multiple input image frames 402 can also have different image contents when capturing dynamic scenes, such as when different portions of the input image frames 402 have different luminance (BV).

The input image frames 402 are processed using various operations in the image processing pipeline 400. For example, each input image frame 402 may be provided to an image preprocessing operation 404, which generally operates to process each input image frame 402 and provide desired corrections or modifications to the input image frame 402. As particular examples, the preprocessing operation 404 may perform bad pixel correction, which refers to a process for identifying image data from bad pixels of the imaging sensor(s) 180 and replacing the bad image data (such as via interpolation of neighboring good pixel data). The preprocessing operation 404 may perform lens shading correction for each input image frame 402 in order to compensate for peripheral shading created by one or more lenses used in or with one or more imaging sensors 180. The preprocessing operation 404 may perform white balance adjustment in order to modify the white balance of each input image frame 402. The preprocessing operation 404 may perform any other or additional corrections or modifications to each input image frame 402. Note, however, that this disclosure is not limited to any particular technique(s) for preprocessing image frames.

The preprocessed versions of the input image frames 402 are provided to an image alignment operation 406, which generally operates to modify one or more of the preprocessed input image frames 402 in order to generate aligned versions of the preprocessed input image frames 402. For example, the preprocessed input image frames 402 may undergo alignment so that common features in different preprocessed input image frames 402 are at the same or substantially the same locations in the aligned versions of the preprocessed image frames 402. In some embodiments, the alignment operation 406 may select a reference image frame and modify one or more non-reference image frames so as to be aligned with the reference image frame. In some cases, for instance, the alignment operation 406 generates a warp or alignment map for each non-reference image frame, where each warp or alignment map includes or is based on one or more motion vectors that identify how the position(s) of one or more specific features in the associated non-reference image frame should be altered in order to be in the position(s) of the same feature(s) in the reference image frame. Among other reasons, alignment may be needed in order to compensate for misalignment caused by the electronic device 101 moving or rotating in between image captures, which causes objects in the input image frames 402 to move or rotate slightly (as is common with handheld devices). The alignment operation 406 may use any suitable technique(s) for image alignment, which is also sometimes referred to as image registration. In some embodiments, the preprocessed input image frames 402 can be aligned both geometrically and photometrically. In particular embodiments, the alignment operation 406 can use global Oriented FAST and Rotated BRIEF (ORB) features and local features from a block search to identify how to align the image frames. Note, however, that this disclosure is not limited to any particular technique(s) for aligning image frames.

The aligned versions of the input image frames 402 are provided to an image blending operation 408, which generally operates to combine image data contained in the aligned input image frames 402 in order to generate a blended image. For instance, the blending operation 408 may process the aligned input image frames 402 in order to modify portions of the selected reference frame using image data from one or more non-reference frames. As a particular example, the blending operation 408 may take the reference frame and replace one or more portions of the reference frame containing motion with one or more corresponding portions of shorter-exposure image frames. As another particular example, the blending operation 408 may take the reference frame and replace one or more portions of the reference frame capturing darker areas of a scene with one or more corresponding portions of shorter-exposure image frames. In some cases, the blending operation 408 may perform a weighted blending operation to combine the pixel values contained in the aligned image frames 402. Note, however, that this disclosure is not limited to any particular technique(s) for combining image frames.

The blended image is provided to an image demosaic operation 410, which generally operates to convert image data produced using a Bayer filter array or other color filter array into reconstructed red-green-blue (RGB) data or other image data in order to generate a demosaiced image. For example, the demosaic operation 410 can perform various interpolations to fill in missing information, such as by estimating other colors' image data for each pixel. When using a Bayer filter array or some other types of color filter arrays, approximately twice as many pixels may capture image data using green filters compared to pixels that capture image data using red or blue filters. This can introduce non-uniformities into the captured image data, such as when the red and blue image data each have a lower SNR and a lower sampling rate compared to the green image data. Among other things, the green image data can capture high-frequency image content more effectively than the red and blue image data. The demosaic operation 410 can take information captured by at least one highly-sampled channel (such as the green channel and/or the white channel) and use that information to correct limitations of lower-sampled channels (such as the red and blue channels), which can help to reintroduce high-frequency image content into the red and blue image data. Note, however, that this disclosure is not limited to any particular technique(s) for demosaicing images.

The demosaiced image is provided to a noise filtering operation 412, which generally operates to process the demosaiced image and remove noise from the demosaiced image in order to generate a filtered image. For example, the noise filtering operation 412 may be used to remove sampling, interpolation, and aliasing artifacts and noise in sub-sampled image color channels (such as the red and blue channels) of the demosaiced image using information from at least one higher-sampled color channel (such as the green channel and/or the white channel) of the demosaiced image. The noise filtering operation 412 may also or alternatively be used to filter the image data of the demosaiced image in order to remove noise from object edges, which can help to provide cleaner edges to objects captured in the demosaiced image. The noise filtering operation 412 may use any suitable technique(s) for filtering image data, such as spatial noise filtering. Note, however, that this disclosure is not limited to any particular technique(s) for filtering image data.

The filtered image is provided to an image sharpening operation 414, which generally operates to sharpen the filtered image and generate a sharpened image. The sharpened image represents an image that contains less blur than the filtered image. Even if the sharpened image might still contain some amount of blur, the amount of blur is less than in the filtered image. The image sharpening operation 414 may use any suitable technique(s) for sharpening images. Note, however, that this disclosure is not limited to any particular technique(s) for sharpening images.

The sharpened image is provided to a tone mapping operation 416, which generally operates to adjust colors in the sharpened image. This can be useful or important in various applications, such as when generating HDR images. For instance, since generating an HDR image often involves capturing multiple images of a scene using different exposures and combining the captured images to produce the HDR image, this type of processing can often result in the creation of unnatural tone within the HDR image. The tone mapping operation 416 can therefore use one or more color mappings to adjust the colors contained in the sharpened image. The output of the tone mapping operation 416 can represent an output image 418, which may represent a final image of the scene. Note, however, that the output image 418 may undergo one or more additional post-processing operations (if desired) to produce a final image of the scene. The tone mapping operation 416 may use any suitable technique(s) to perform tone mapping, such as one or more global tone mapping techniques and/or one or more local tone mapping techniques. As a particular example, the tone mapping operation 416 may multiply each pixel of the sharpened image by a corresponding gain value to help ensure that the resulting output image 418 can be displayed appropriately.

Although FIG. 4 illustrates one example of an image processing pipeline 400 supporting multi-frame HDR image generation using quanta image frames, various changes may be made to FIG. 4. For example, various components or functions in FIG. 4 may be combined, further subdivided, replicated, rearranged, or omitted according to particular needs. Also, various additional components or functions may be used in FIG. 4. In addition, the specific image processing pipeline 400 described above is for illustration and explanation only. Various image processing pipelines have been developed, and additional image processing pipelines are sure to be developed in the future. This disclosure is not limited to any specific implementation of an image processing pipeline 400 or even to use within an image processing pipeline. In general, the techniques for multi-frame HDR image generation using quanta image frames that are described in this patent document may be used in any other image processing pipeline or other architecture.

FIGS. 5 through 7 illustrate example techniques for using quanta image frames during HDR image generation in accordance with this disclosure. More specifically, FIGS. 5 through 7 illustrate different ways in which input image frames may be processed to support HDR image generation. For ease of explanation, the techniques shown in FIGS. 5 through 7 are described as being implemented on or supported by the electronic device 101 in the network configuration 100 of FIG. 1, where the electronic device 101 may include a multi-mode image sensor such as one shown in FIG. 2 or 3 and may implement or support the image processing pipeline 400 shown in FIG. 4. However, the techniques shown in FIGS. 5 through 7 could be used with any other suitable device(s) and in any other suitable system(s), and the techniques shown in FIGS. 5 through 7 could be used with any suitable dual-mode or other multi-mode image sensor and with any suitable image processing pipeline.

As shown in FIG. 5, a first technique 500 involves the capture of multiple first image frames 502, 504, and 506 using different exposure times. In this example, the electronic device 101 uses a multi-mode image sensor to capture at least one "short" image frame 502, at least one "medium" image frame 504, and at least one "long" image frame 506. The short image frame(s) 502 can be captured using a first exposure time, the medium image frame(s) 504 can be captured using a second exposure time greater than the first exposure time, and the long image frame(s) 506 can be captured using a third exposure time greater than the second exposure time.

While one short image frame 502, one medium image frame 504, and three long image frames 506 are shown as being captured here, this is for illustration and explanation only, and the numbers of the image frames 502, 504, 506 can easily vary as needed or desired. Also, while the ordering here shows the image frames being captured in a specific order, this is for illustration and explanation only, and the ordering of the image frames 502, 504, 506 can easily vary as needed or desired. In addition, each of the image frames 502, 504, 506 can have any suitable bit depth, such as when each image frame 502, 504, 506 includes eight-bit to twelve-bit image data.

Note that the terms "short," "medium," and "long" do not impart any specific range of exposure times on the image frames 502, 504, and 506. Rather, "short" is merely used to indicate that the image frame(s) 502 can have the shortest exposure time(s) among the image frames 502, 504, 506. "Long" is merely used to indicate that the image frame(s) 506 can have the longest exposure time(s) among the image frames 502, 504, 506. "Medium" is merely used to indicate that the image frame(s) 504 can have exposure time(s) in between the exposure times of the image frames 502, 506. In some embodiments, the "medium" exposure time may refer to the exposure time determined automatically based on the scene being imaged and the settings of the electronic device 101, where this setting may sometimes be referred to as the "auto" or "EV-0" exposure time.

The first technique 500 also involves the capture of multiple second image frames 508, which can be referred to as quanta image frames. In this example, the electronic device 101 uses the multi-mode image sensor to capture multiple sets 510 of second image frames 508, where each set 510 of second image frames 508 is captured in between each consecutive pair of the first image frames 502, 504, 506. Each set 510 may include any suitable number of second image frames 508, including a single second image frame 508 or multiple second image frames 508. Each second image frame 508 is captured using an exposure time that is shorter than any of the exposure times of the first image frames 502, 504, 506. Note that while FIG. 5 may assume that the second image frames 508 are all captured using the same exposure time, this is not necessarily required. In some embodiments, the exposure time(s) used to capture the second image frames 508 can be significantly shorter than the exposure times used to capture the first image frames 502, 504, 506. Each of the second image frames 508 can have any suitable bit depth, such as when each image frame 508 includes one-bit to three-bit image data.

In the example shown in FIG. 5, the various image frames 502, 504, 506, 508 can be used as the input image frames 402, which can be provided to the image processing pipeline 400 of FIG. 4 for processing. The second image frames 508 here can be used by the image processing pipeline 400 to support the generation of an output image 418 using the first image frames 502, 504, 506, where the output image 418 has improved quality because the second image frames 508 are available for use. For example, the second image frames 508 may be used by the image alignment operation 406 to support improved alignment of the first image frames 502, 504, 506 and optionally the second image frames 508. The second image frames 508 may also or alternatively be used by the blending operation 408 to generate a blended image having less blur. Note that the second image frames 508 have a smaller bit depth (and possibly a much smaller bit depth) compared to the first image frames 502, 504, 506, so the blending operation 408 may not blend image data from individual ones of the second image frames 508 with image data of the first image frames 502, 504, 506. However, the blending operation 408 may use the contents of the second image frames 508 to select portions of the first image frames 502, 504, 506 for blending or to otherwise support blending of the first image frames 502, 504, 506. Also or alternatively, the second image frames 508 may be used by one or more other operations 410, 412, 414, 416 in the image processing pipeline 400 during generation of the output image 418.

As shown in FIG. 6, a second technique 600 again involves the capture of the first image frames 502, 504, and 506 and the second image frames 508. In this example, multiple second image frames 508 are captured in between each consecutive pair of the first image frames 502, 504, 506. Because some MFP pipelines may not be designed to operate with lower bit-depth image frames (such as the second image frames 508), the technique 600 in FIG. 6 combines each set 510 of second image frames 508 to produce a third image frame 602. For example, in some embodiments, each of the third image frames 602 may be generated by accumulating the image data contained in the corresponding set 510 of second image frames 508.

This type of approach can be beneficial in various circumstances, such as when the third image frames 602 contain less blur in the presence of fast motion compared to a conventional CMOS image frame exposed for the same length of time. Also, in low-light conditions, the third image frames 602 can have better SNR compared to a conventional CMOS image frame exposed for the same length of time since the second image frames 508 can be generated using little if any read noise. Note that the first image frames 502, 504, and 506 and the third image frames 602 are shown here as being provided to the image processing pipeline 400 as the input image frames 402. In other embodiments, the first image frames 502, 504, and 506 and the second image frames 508 may be provided to the image processing pipeline 400 as the input image frames 402, and the image processing pipeline 400 itself may combine the second image frames 508 in order to generate the third image frames 602.

There are various ways in which the second image frames 508 may be combined in order to generate the third image frames 602. For example, in some embodiments, a machine learning model may be trained to combine second image frames 508 and generate third image frames 602. The machine learning model could be trained using training data that includes various sets of second image frames 508 and ground truth data that includes various third image frames 602. The machine learning model can be trained to process the sets of second image frames 508 and generate estimates of third image frames 602. The estimates of the third image frames 602 can be compared to the associated ground truths in order to identify errors in the results generated by the machine learning model. Weights or other parameters of the machine learning model can be adjusted based on the errors, and the adjusted machine learning model can again be used to process the same or different sets of second image frames 508 and generate additional estimates of third image frame 602. Additional errors can be determined, and additional adjustments to the machine learning model can be made if needed. Ideally, over time, the losses decrease as training progresses until the machine learning model is trained to generate third image frames 602 with suitable accuracy. As a particular example, the machine learning-based approaches described in Chi et al., "Dynamic Low-Light Imaging with Quanta Image Sensors," Computer Vision-ECCV 2020: 16th European Conference, August 2020 (which is hereby incorporated by reference in its entirety) may be modified using suitable training data as described above. In other embodiments, the image processing pipeline 400 itself may be modified to process image frames having smaller bit depths. As a particular example, the techniques described in Ma et al., "Quanta Burst Photography," ACM Transactions on Graphics, Volume 39, Issue 4, August 2020 (which is hereby incorporated by reference in its entirety) may be used to process image frames having smaller bit depths.

As shown in FIG. 7, a third technique 700 again involves the capture of the first image frames 502, 504, and 506 and the second image frames 508. In this example, a single second image frame 508 is captured on each side of each first image frame 502, 504, and 506 (although there could be more than one second image frame 508 captured on each side of each first image frame 502, 504, and 506). The first image frames 502, 504, and 506 are provided to the image processing pipeline 400 as the input image frames 402. Moreover, multiple sets 702-710 of image frames are defined here, where each set 702-710 includes (i) one of the first image frames 502, 504, and 506, (ii) at least one second image frame 508 captured before that first image frame, and (iii) at least one second image frame 508 captured after that first image frame.

These sets 702-710 of image frames are provided to a blur kernel determination operation 712, which generally operates to process each set 702-710 of image frames and generate a blur kernel for the first image frame 502, 504, or 506 in that set 702-710. Blur kernels represent deconvolution kernels, which are a spatially-varying set of filter kernels that can be used to sharpen an image frame. The blur kernel determination operation 712 may use any suitable technique to generate blur kernels using the sets 702-710 of image frames. As a particular example, the blur kernel determination operation 712 may use the techniques disclosed in U.S. Patent Publication No. 2023/0022753 A1 (which is hereby incorporated by reference in its entirety) to generate the blur kernels using the sets 702-710 of image frames.

An image frame selection operation 714 processes the blur kernels in order to select one of the first image frames 502, 504, and 506 as a reference frame. For example, the image frame selection operation 714 can process the blur kernels in order to select the first image frame 502, 504, or 506 having the lowest amount of blur. An identification 716 of the selected first image frame 502, 504, or 506 or the selected first image frame 502, 504, or 506 itself can be provided to the alignment operation 406 so that the alignment operation 406 can use the selected first image frame 502, 504, or 506 as a reference frame during image alignment. The image frame selection operation 714 may use any suitable technique to select one of the first image frames 502, 504, and 506 based on the blur kernels. For instance, the image frame selection operation 714 may generate a blur score for each blur kernel and select the first image frame 502, 504, or 506 associated with the blur kernel having the lowest blur score. As a particular example, the blur score for each blur kernel may represent or be based on the average width of the blur kernel or the maximum width of the blur kernel.

Although FIGS. 5 through 7 illustrate examples of techniques for using quanta image frames during HDR image generation, various changes may be made to FIGS. 5 through 7. For example, various components or functions in each of FIGS. 5 through 7 may be combined, further subdivided, replicated, rearranged, or omitted according to particular needs. Also, various additional components or functions may be used in each of FIGS. 5 through 7. In addition, while FIGURES S through 7 illustrate three examples of how the various types of image frames captured using a multi-mode image sensor may be used, the various types of image frames captured using the multi-mode image sensor may be used in any other suitable manner.

FIGS. 8 through 10 illustrate example methods 800, 900, 1000 for HDR image generation using quanta image frames in accordance with this disclosure. For ease of explanation, the methods 800, 900, 1000 shown in FIGS. 8 through 10 are described as being performed by the electronic device 101 in the network configuration 100 of FIG. 1, where the electronic device 101 may include a multi-mode image sensor such as one shown in FIG. 2 or 3 and may implement or support the image processing pipeline 400 shown in FIG. 4 and any of the techniques 500, 600, 700 shown in FIGS. 5 through 7. However, the methods 800, 900, 1000 shown in FIGS. 8 through 10 could be used with any other suitable device(s) and in any other suitable system(s), and the methods 800, 900, 1000 shown in FIGS. 8 through 10 could be used with any suitable dual-mode or other multi-mode image sensor, any suitable image processing pipeline, and any other suitable image processing technique.

As shown in FIG. 8, first image frames and second image frames of a scene are obtained at step 802. This may include, for example, the processor 120 of the electronic device 101 obtaining the first image frames 502, 504, 506 and the second image frames 508 using a multi-mode image sensor, such as one shown in FIG. 2 or 3. The first image frames 502, 504, 506 include image data having a first bit depth, and the second image frames 508 include image data having a second bit depth smaller than the first bit depth. The first image frames 502, 504, 506 are captured using two or more exposure times, and the second image frames 508 are captured using at least one exposure time shorter than the two or more exposure times. At least one of the second image frames 508 is captured in between each consecutive pair of the first image frames 502, 504, 506.

The first image frames and the second image frames are provided to an image processing pipeline at step 804, and the first image frames and the second image frames are processed using the image processing pipeline at step 806. This may include, for example, the processor 120 of the electronic device 101 using the image processing pipeline 400 to perform various preprocessing, alignment, blending, demosaicing, filtering, sharpening, and tone mapping operations. As part of the processing, the first image frames are aligned and combined using the image processing pipeline under the guidance of the second image frames at step 808. This may include, for example, the processor 120 of the electronic device 101 performing the image alignment operation 406 in order to register the first image frames 502, 504, 506 and performing the image blending operation 408 in order to combine the aligned first image frames 502, 504, 506. Either or both of these operations may be guided using the second image frames 508, such as when the second image frames 508 are used to support improved registration of the first image frames 502, 504, 506 and/or improved blending of the first image frames 502, 504, 506. Note, however, that the second image frames 508 may also or alternatively be used during any other suitable operation(s) performed by the image processing pipeline 400.

The processing results in the generation of an output image by the image processing pipeline at step 810. This may include, for example, the processor 120 of the electronic device 101 generating an output image 418 that represents an HDR image having a higher dynamic range than any individual one of the first and second image frames. The output image is stored, output, or used in some manner at step 812. For example, the output image 418 may be displayed on the display 160 of the electronic device 101, saved to a camera roll stored in a memory 130 of the electronic device 101, or attached to a text message, email, or other communication to be transmitted from the electronic device 101. Of course, the output image 418 could be used in any other or additional manner.

As shown in FIG. 9, first image frames and second image frames of a scene are obtained at step 902. This may include, for example, the processor 120 of the electronic device 101 obtaining the first image frames 502, 504, 506 and the second image frames 508 using a multi-mode image sensor, such as one shown in FIG. 2 or 3. The first image frames 502, 504, 506 include image data having a first bit depth, and the second image frames 508 include image data having a second bit depth smaller than the first bit depth. The first image frames 502, 504, 506 are captured using two or more exposure times, and the second image frames 508 are captured using at least one exposure time shorter than the two or more exposure times. Multiple second image frames 508 are captured in between each consecutive pair of the first image frames 502, 504, 506.

The second image frames are combined to generate third image frames at step 904. This may include, for example, the processor 120 of the electronic device 101 accumulating the image data contained in each set 510 of second image frames 508 to generate one of the third image frames 602. Note that the combination of the second image frames 508 to generate the third image frames 602 may occur within an image processing pipeline 400 or outside the image processing pipeline 400.

The first image frames and optionally the third image frames (if generated outside the image processing pipeline) are provided to the image processing pipeline at step 906, and the first image frames and the third image frames are processed using the image processing pipeline at step 908. This may include, for example, the processor 120 of the electronic device 101 using the image processing pipeline 400 to perform various preprocessing, alignment, blending, demosaicing, filtering, sharpening, and tone mapping operations. As part of the processing, the first image frames and the third image frames are aligned and combined using the image processing pipeline at step 910. This may include, for example, the processor 120 of the electronic device 101 performing the image alignment operation 406 in order to register the image frames 502, 504, 506, 602 and performing the image blending operation 408 in order to combine the aligned image frames 502, 504, 506, 602.

The processing results in the generation of an output image by the image processing pipeline at step 912. This may include, for example, the processor 120 of the electronic device 101 generating an output image 418 that represents an HDR image having a higher dynamic range than any individual one of the first and second image frames. The output image is stored, output, or used in some manner at step 914. For example, the output image 418 may be displayed on the display 160 of the electronic device 101, saved to a camera roll stored in a memory 130 of the electronic device 101, or attached to a text message, email, or other communication to be transmitted from the electronic device 101. Of course, the output image 418 could be used in any other or additional manner.

As shown in FIG. 10, first image frames and second image frames of a scene are obtained at step 1002. This may include, for example, the processor 120 of the electronic device 101 obtaining the first image frames 502, 504, 506 and the second image frames 508 using a multi-mode image sensor, such as one shown in FIG. 2 or 3. The first image frames 502, 504, 506 include image data having a first bit depth, and the second image frames 508 include image data having a second bit depth smaller than the first bit depth. The first image frames 502, 504, 506 are captured using two or more exposure times, and the second image frames 508 are captured using at least one exposure time shorter than the two or more exposure times. At least one second image frame 508 is captured on each side of each first image frame 502, 504, 506.

The first image frames and the second image frames are used to identify a reference image frame at step 1004. This may include, for example, the processor 120 of the electronic device 101 performing the blur kernel determination operation 712 using multiple sets 702-710 of image frames, where each set 702-710 includes (i) one of the first image frames 502, 504, 506, (ii) at least one second image frame 508 captured before that first image frame, and (iii) at least one second image frame 508 captured after that first image frame. This may also include the processor 120 of the electronic device 101 performing the image frame selection operation 714 to identify the first image frame 502, 504, 506 having the lowest amount of blur. In some embodiments, the image frame selection operation 714 can generate a blur score for each first image frame 502, 504, 506 based on the blur kernel for that first image frame and select the first image frame with the lowest blur score. In particular embodiments, each blur score can represent or be based on an average width or a maximum width of the associated blur kernel.

The first image frames are provided to the image processing pipeline at step 1006, and the first image frames are processed using the image processing pipeline based on the selected reference image frame at step 1008. This may include, for example, the processor 120 of the electronic device 101 using the image processing pipeline 400 to perform various preprocessing, alignment, blending, demosaicing, filtering, sharpening, and tone mapping operations. As part of the processing, the first image frames are aligned and combined using the image processing pipeline at step 1010. This may include, for example, the processor 120 of the electronic device 101 performing the image alignment operation 406 in order to register the image frames 502, 504, 506 and performing the image blending operation 408 in order to combine the aligned image frames 502, 504, 506. Either or both of these operations can use the selected first image frame as the reference image frame.

The processing results in the generation of an output image by the image processing pipeline at step 1012. This may include, for example, the processor 120 of the electronic device 101 generating an output image 418 that represents an HDR image having a higher dynamic range than any individual one of the first and second image frames. The output image is stored, output, or used in some manner at step 1014. For example, the output image 418 may be displayed on the display 160 of the electronic device 101, saved to a camera roll stored in a memory 130 of the electronic device 101, or attached to a text message, email, or other communication to be transmitted from the electronic device 101. Of course, the output image 418 could be used in any other or additional manner.

Although FIGS. 8 through 10 illustrate examples of methods 800, 900, 1000 for HDR image generation using quanta image frames, various changes may be made to FIGS. 8 through 10. For example, while shown as a series of steps, various steps in each of FIGS. 8 through 10 may overlap, occur in parallel, occur in a different order, or occur any number of times.

It should be noted that the functions shown in or described with respect to FIGS. 2 through 10 can be implemented in an electronic device 101, server 106, or other device(s) in any suitable manner. For example, in some embodiments, at least some of the functions shown in or described with respect to FIGS. 2 through 10 can be implemented or supported using one or more software applications or other software instructions that are executed by the processor 120 of the electronic device 101, server 106, or other device(s). In other embodiments, at least some of the functions shown in or described with respect to FIGS. 2 through 10 can be implemented or supported using dedicated hardware components. In general, the functions shown in or described with respect to FIGS. 2 through 10 can be performed using any suitable hardware or any suitable combination of hardware and software/firmware instructions. Also, the functions shown in or described with respect to FIGS. 2 through 10 can be performed by a single device or by multiple devices.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
obtaining, using a multi-mode image sensor, first image frames and second image frames, wherein:
   the first image frames comprise image data having a first bit depth;
   the second image frames comprise image data having a second bit depth smaller than the first bit depth;
   the first image frames are captured using two or more exposure times;
   the second image frames are captured using at least one exposure time shorter than the two or more exposure times; and
   two or more of the second image frames are captured in between each consecutive pair of the first image frames;
combining the two or more second image frames captured in between each consecutive pair of the first image frames to generate third image frames; and
processing at least the first and third image frames using a multi-frame processing (MFP) pipeline to generate an output image.

2. The method of claim 1, wherein processing at least the first and third image frames using the MFP pipeline to generate the output image comprises processing the first, second, and third image frames using the MFP pipeline to generate the output image.

3. The method of claim 1, wherein the MFP pipeline combines the two or more second image frames captured in between each consecutive pair of the first image frames to generate the third image frames.

4. The method of claim 1, further comprising:
determining a blur kernel for each of the first image frames based on the first image frame, at least one second image frame before the first image frame, and at least one second image frame after the first image frame; and
identifying the first image frame having a lowest amount of blur; and
wherein processing at least the first and third image frames using the MFP pipeline to generate the output image comprises performing image alignment in the MFP pipeline based on the first image frame having the lowest amount of blur.

5. The method of claim 4, wherein:
identifying the first image frame having the lowest amount of blur comprises determining a blur score for each of the first image frames and selecting the first image frame having a lowest blur score; and
the blur score for each first image frame represents or is based on an average width or a maximum width of the blur kernel for the first image frame.

6. The method of claim 1, wherein the first image frames comprise:
at least one short image frame captured using a first exposure time;
at least one medium image frame captured using a second exposure time greater than the first exposure time; and
at least one long image frame captured using a third exposure time greater than the second exposure time; and
wherein the at least one exposure time used to capture the second image frames is shorter than the first exposure time.

7. An electronic device comprising:

a multi-mode image sensor configured to capture first image frames and second image frames, wherein the multi-mode image sensor is configured such that:

the first image frames comprise image data having a first bit depth;

the second image frames comprise image data having a second bit depth smaller than the first bit depth;

the first image frames are captured using two or more exposure times;

the second image frames are captured using at least one exposure time shorter than the two or more exposure times; and at least one of the second image frames is captured in between each consecutive pair of the first image frames; and at least one processing device configured to:

determine a blur kernel for each of the first image frames based on the first image frame, at least one second image frame before the first image frame, and at least one second image frame after the first image frame;

identify the first image frame having a lowest amount of blur; and process at least the first image frames using a multi-frame processing (MFP) pipeline to generate an output image, the at least one processing device configured to perform image alignment using the MFP pipeline based on the first image frame having the lowest amount of blur.

8. The electronic device of claim 7, wherein the at least one processing device is configured to process the first image frames and the second image frames using the MFP pipeline to generate the output image.

9. The electronic device of claim 7, wherein:

the multi-mode image sensor is configured to capture two or more of the second image frames in between each consecutive pair of the first image frames;

the at least one processing device is further configured to combine the two or more second image frames captured in between each consecutive pair of the first image frames to generate third image frames; and the at least one processing device is configured to process at least the first image frames and the third image frames using the MFP pipeline to generate the output image.

10. The electronic device of claim 9, wherein the MFP pipeline is configured to combine the two or more second image frames captured in between each consecutive pair of the first image frames to generate the third image frames.

11. The electronic device of claim 7, wherein:

to identify the first image frame having the lowest amount of blur, the at least one processing device is configured determine a blur score for each of the first image frames and select the first image frame having a lowest blur score; and the blur score for each first image frame represents or is based on an average width or a maximum width of the blur kernel for the first image frame.

12. The electronic device of claim 7, wherein the first image frames comprise:

at least one short image frame captured using a first exposure time;

at least one medium image frame captured using a second exposure time greater than the first exposure time; and at least one long image frame captured using a third exposure time greater than the second exposure time; and wherein the at least one exposure time used to capture the second image frames is shorter than the first exposure time.

13. A non-transitory machine readable medium containing instructions that when executed cause at least one processor of an electronic device to:

obtain, using a multi-mode image sensor, first image frames and second image frames, wherein:

the first image frames comprise image data having a first bit depth;

the second image frames comprise image data having a second bit depth smaller than the first bit depth;

the first image frames are captured using two or more exposure times;

the second image frames are captured using at least one exposure time shorter than the two or more exposure times; and two or more of the second image frames are captured in between each consecutive pair of the first image frames;

combine the two or more second image frames captured in between each consecutive pair of the first image frames to generate third image frames; and process at least the first and third image frames using a multi-frame processing (MFP) pipeline to generate an output image.

14. The non-transitory machine readable medium of claim 13, wherein the instructions when executed cause the at least one processor to process the first, second, and third image frames using the MFP pipeline to generate the output image.

15. The non-transitory machine readable medium of claim 13, wherein:

the instructions when executed further cause the at least one processor to:

determine a blur kernel for each of the first image frames based on the first image frame, at least one second image frame before the first image frame, and at least one second image frame after the first image frame; and identify the first image frame having a lowest amount of blur; and the instructions when executed cause the at least one processor to perform image alignment using the MFP pipeline based on the first image frame having the lowest amount of blur.

16. The non-transitory machine readable medium of claim 15, wherein:

the instructions that when executed cause the at least one processor to identify the first image frame having the lowest amount of blur comprise instructions that when executed cause the at least one processor to determine a blur score for each of the first image frames and select the first image frame having a lowest blur score; and the blur score for each first image frame represents or is based on an average width or a maximum width of the blur kernel for the first image frame.

17. The non-transitory machine readable medium of claim 13, wherein the first image frames comprise:

at least one short image frame captured using a first exposure time;

at least one medium image frame captured using a second exposure time greater than the first exposure time; and at least one long image frame captured using a third exposure time greater than the second exposure time; and wherein the at least one exposure time used to capture the second image frames is shorter than the first exposure time.

18. The electronic device of claim 7, wherein the multi-mode image sensor comprises:

a single-photon avalanche diode (SPAD)-based quanta image sensor; and a complementary metal-oxide semiconductor (CMOS)-based quanta image sensor.

19. The electronic device of claim 7, wherein the multi-mode image sensor comprises:

a single-photon avalanche diode coupled in series with a transistor;

a discriminator coupled between the single-photon avalanche diode and the transistor; and a counter configured to count a number of times that the single-photon avalanche diode detects one or more photons.

20. The electronic device of claim 7, wherein the multi-mode image sensor comprises:

a plurality of pixels each configured to sense illumination;

a plurality of switches each configured to control whether an output from one of the pixels is read;

an amplifier;

a plurality of row select lines and a plurality of column select lines configured to control which of the pixels is coupled to the amplifier; and an analog-to-digital converter configured to convert an amplified signal from the amplifier into a digital value.

\* \* \* \* \*